June 9, 1964 J. E. J. G. TOUSSAINT 3,136,978

ELECTRICAL ENCODING SYSTEM

Filed May 8, 1959

4 Sheets-Sheet 1

Inventor,
JEAN E. J. G TOUSSAINT

By Robert Harding Jr.
Attorney

June 9, 1964

J. E. J. G. TOUSSAINT 3,136,978

ELECTRICAL ENCODING SYSTEM

Filed May 8, 1959

4 Sheets-Sheet 2

Inventor
JEAN E. J.G TOUSSAINT

By Robert Harding Jr.
Attorney

June 9, 1964
J. E. J. G. TOUSSAINT
3,136,978
ELECTRICAL ENCODING SYSTEM
Filed May 8, 1959
4 Sheets-Sheet 3

INVENTOR.
JEAN E. J. G. TOUSSAINT
BY
Robert Lieber
ATTORNEY

INVENTOR.
JEAN E. J. G. TOUSSAINT
BY Robert Lieber
ATTORNEY 3,136,978

ELECTRICAL ENCODING SYSTEM

Jean Emile Joseph Ghislain Toussaint, Antwerp, Belgium, assignor to International Standard Electric Corporation, New York, N.Y., a corporation of Delaware
Filed May 8, 1959, Ser. No. 811,871
Claims priority, application Belgium June 21, 1958
9 Claims. (Cl. 340—172.5)

Figure 1:
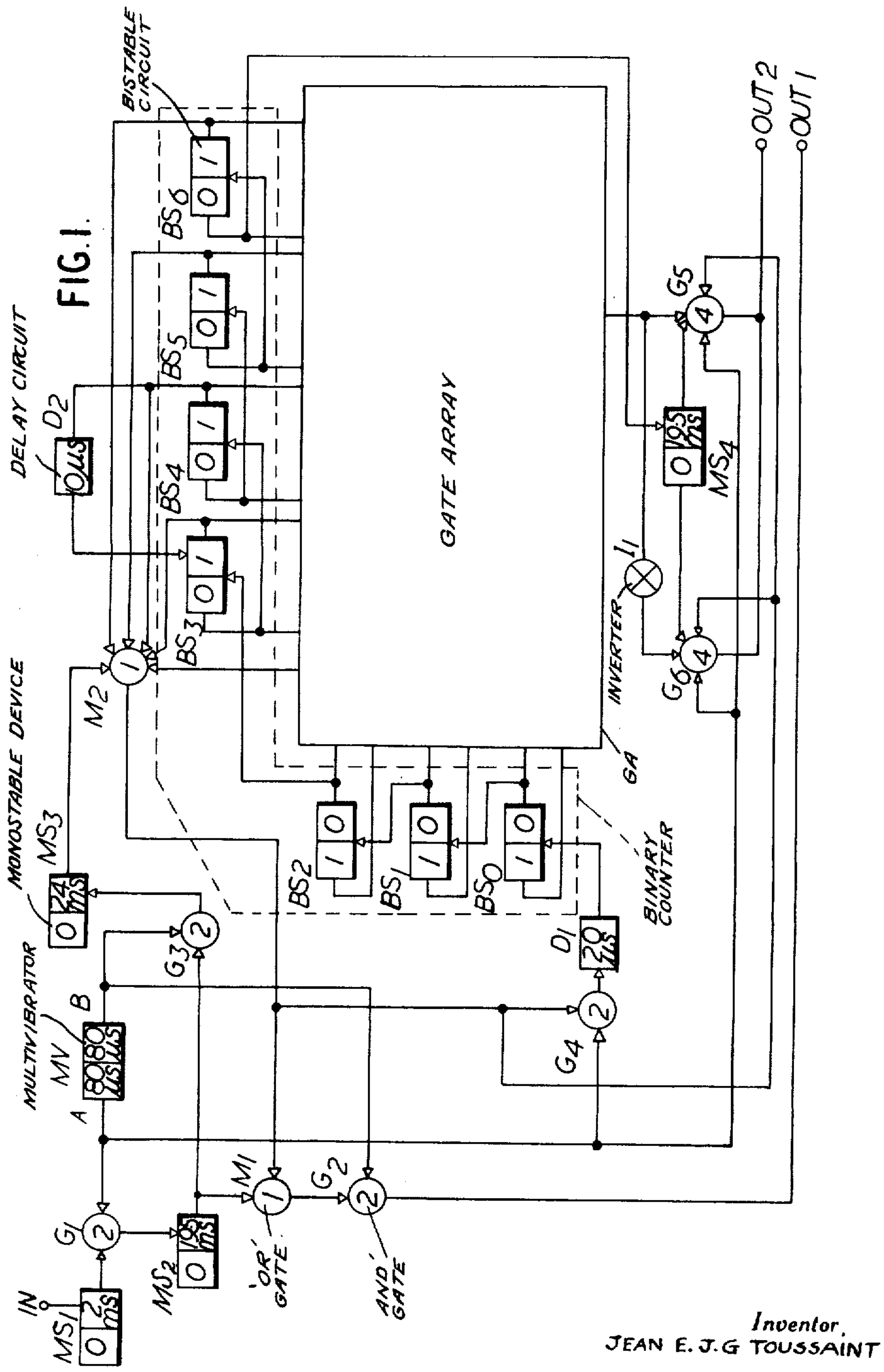

The invention relates to an electrical encoding system and more particularly to a system comprising recording means to store a plurality of binary conditions, and adapted to reproduce said conditions dynamically as a series of pulse signals.

Such a system may advantageously be used in known document processing machines which enable an operator to code information read from a document, such as a cheque, on a piece of magnetic tape integrated with a document carrier or envelope into which the document is inserted. The electrical circuits needed for encoding the information necessitate the production of a series of information pulses for application on to the magnetic tape, either by displacing a magnetic head over the document carrier bearing the tape, or by using a fixed head which prints the information as the document carrier moves past, and involves the use of a shift register. The decimal digits keyed by the operator are fed one by one to the shift register using a binary code, so that each time the operator depresses a key, four binary bits are impressed in parallel on four adjacent stages of the shift register. Thereafter, four advancing pulses are impressed on the shift register to advance the decimal digit, and the four input stages of the shift register then become available to receive the binary bits characterising the next decimal digit. After all the information has thus been inserted in the shift register, a stream of advancing pulses will be applied to the latter in order to produce the required series of information pulses to be printed on the magnetic tape.

Bearing in mind: the required speed of advancement of the shift register when the latter is being emptied on to the tape; the necessity of an easy visual control, obtained for instance by using a cold cathode tube as the main element of a shift register stage; and the necessary stabilized power supplies; the cost of a shift register stage is rather high. Moreover the information to be keyed, sometimes includes an appreciable number of decimal digits, and since the number of stages must be equal to four times the number of decimal digits, the overall cost of the shift register is of some consequence. In a known system, as documents are inserted in their carriers or envelopes, and the latter are encoded, listings of these documents are prepared, through the use of adding machines which permit the totaling of the amounts of a series of cheques having the same account number. Although the adding machines used are provided with keyboards, these are not manually operated by the operator; instead he is provided with a special keyboard associated with relay circuitry in order to translate each decimal digit into a four-digit binary number representation as the decimal digit is keyed. The relays recording the four-digit binary numbers are then used to drive the four input stages of the shift register. This additional keyboard is needed to avoid registration of a large number of decimal digits prior to their being recorded on the shift register.

Indeed, conventional adding machines mechanically store representations of the digits as they are keyed, and it is only after a whole number has been keyed, e.g. the account number of a cheque or its amount, and upon the operation of a motor bar, that all of the digits previously keyed may be simultaneously registered at the output of the adding machine in the form of a combination of closed electrical contacts. For example, ten series of ten electrical contacts may be available on the adding machine to simultaneously characterise ten decimal digits. Additional relays would be necessary to record simultaneously all of these decimal digits and translate them into four digit binary numbers.

If the adding machine keyboard were to be used directly to feed the shift register, instead of only four input stages of the shift register, something like forty input stages would be required. Thus, in addition to a rather expensive shift register, an appreciable amount of relays would have to be provided. It is therefore more convenient to use a special keyboard which records and delivers representations of the keyed decimal digits one by one to the shift register, these digits being at the same time "keyed" on the adding machine by providing the digit keys of the latter with solenoids which are energized accordingly.

A general object of the invention is to provide an electrical encoding system, as defined above, capable of producing a series of information pulses, without the need of a shift register.

In accordance with the invention, an electrical encoding system, as previously defined, is characterised; in that it includes a binary counter having the capacity to count through a plurality of binary digital conditions, in that the stages of said binary counter control an array of gates which are also controlled by a previously stored binary-decimal representation so as to produce either a pulse or no pulse for each condition of said binary counter in accordance with the binary condition of one particular stored signal, whereby said array of gates may deliver said series of pulses at the rate of a pulse source driving said binary counter.

Such an arrangement avoids the use of a shift register which is then advantageously replaced; by pre-recording means involving only relays, by a simple binary counter whose driving is generally simpler than that of a shift register, and by a series of gates.

It is clear, however, that if the binary counter has $m$ stages, whereby it can define $2^m$ successive time units during which the presence of a produced pulse identifies the condition of a binary signal stored on a relay, $2^m$ AND gates will be necessary in addition to an output OR gate. Moreover, since each of these AND gates will be controlled from the $m$ stages of the binary counter while the output OR gate will be fed from all AND gates, the total number of inputs of the gate array will be equal to $(m+1)2^m$. In general, one rectifier will be needed per gate input and therefore, the last number represents the number of rectifiers required for the gate array. Thus, if $m=7$ permitting the encoding of $2^{7-2}=32$ decimal digits, the total number of gate inputs will be equal to 1024 or $(7+1)2^7$. In some cases, such a large number of gate inputs or rectifiers might, to some extent, offset the advantage of eliminating the shift register.

Another object of the invention is to realize an electrical encoding system, as characterised above, and using a binary counter controlling an array of gates, in such a manner that the total number of gate inputs of said array is minimized.

In accordance with another characteristic of the invention, an electrical encoding system, as characterised above, is further characterised; in that said binary counter is divided into a first part adapted to a count of $n$ and cascaded with the remaining part adapted to a count of $p$; in that a plurality of $n$ OR gates are controlled from the stages of said first part so that each provides an activating signal except for one particular condition of said first part where it provides an inhibiting signal; in that a plurality of $p$ AND gates are controlled from the stages of said remaining part so that each may only deliver an activating signal for one particular condition of said remaining part; in that the outputs of $n$ OR gates are multipled to $n$ further inputs of all of said $p$ AND gates each time under the control of a particular one out of the stored binary signals, which may thus total $np$, so that one of said $n$ inputs for each of said $p$ AND gates may be prevented from exerting an inhibiting action on an AND gate only for one particular condition of said binary signals; and in that all the outputs of said $p$ AND gates feed an output OR gate delivering said series of pulses dynamically characterising the stored information, as said binary counter is driven by said pulse source.

Although the introduction of OR gates in the gate array seems paradoxical, since AND gates are apparently required, the recombination of all the outputs of the $n$ OR gates into the AND gates, but under the control of the stored signals, can nevertheless produce the required dynamic output signals, while the total number of gates and gate inputs is reduced in an outstanding manner.

For one particular condition of the stored binary signals, e.g., 0, the $p$ AND gates can never be activated, since out of the $n$ OR gates, feeding that particular AND gate which is activated by the remaining part of the counter adapted to a count of $p$ and which is therefore the only AND gate which might be activated at a particular moment, there is always one which provides an inhibiting instead of an activating output. However, if the previously recorded binary signal associated with that particular OR gate and that particular AND gate which might be activated, is in the other condition, e.g., 1, then the inhibiting output of that OR gate will be unable to exert its blocking effect on the AND gate considered, whereby the latter will be able to produce an output signal reaching the output of the gate array through the common output OR gate and thereby identifying the condition of one particular binary bit out of the $np$ binary bits previously stored.

In a system adapted to the encoding of 32 decimal numbers and using therefore a binary counter made out of seven stages, the 128 AND gates required to scan the basic arrangement may be replaced by a considerably smaller number of gates, if for instance the seven gates of the binary counter are divided into a first part, comprising the first three stages and into a remaining part comprising the last four stages. Then, $n=2^3=8$ while $p=2^4=16$. Altogether, only 16 AND gates will now be required together with $8+1=9$ OR gates.

Moreover, instead of 1024 gate inputs, only $$(8\times3)+16(4+1+8)=232$$

will now be required. Thus, both the total number of gates and the total number of gate inputs are now reduced to about 20% of the amount needed with the basic scheme.

The control exerted by the stored binary signals on the application of the output of the OR gates to the inputs of the AND gates may readily be realised by means of a contact pertaining to the relay recording the binary bit considered. If the four-digit binary numbers used to characterise the decimal digits include the combination 0000 to characterise the decimal digit 0, e.g. the straight forward binary code, the Aiken code, etc., it is advantageous to use the deenergized condition of the recording relays to correspond with a 0. This will limit the energy consumption, since the rate of probability of the decimal zeros is far greater than that of the other decimal digits. Indeed, although one may provide ten decimal digits for recording amounts of money inscribed on a cheque, it is clear that in general the amounts will not include as many significant digits. Yet, the non significant zeros in front of the actual amount must be encoded on the magnetic tape affixed to the document carrier. If the deenergised condition of a recording relay corresponds to a binary zero, it will be advantageous to also include a break contact of that relay between the output of the OR gates and the inputs of the AND gates. Then, when the relay is deenergised, the contact is closed and during the time unit corresponding to the signal identified by the relay, no output pulse will be produced from the gate array due to the inhibiting control exerted by the OR gate. If the relay is energised however, and the break contact open, the OR gate will be unable to exert its inhibiting control on the AND gate, which together with the OR gate is associated with the particular break contact now open. Therefore, during the time unit corresponding to that contact, the gate array will deliver an output pulse as required.

Apart from reducing the current consumption since the relays remain de-energised for the decimal zeros, the scheme has also the advantage of regularly passing current through the break contacts since the OR gate will regularly perform its inhibiting function through the closed break contacts. By regularly passing current, these will be less subject to deterioration, which is well known to occur if the contact does not pass current for appreciable periods of time.

Another advantage of the invention is that the elimination of the shift register now permits the consideration of the use of relays, to record all the decimal digits forming a number, (using a binary code for each decimal digit), as a particularly economical solution, provided the special keyboard is removed when one or more adding machines have to be provided to make listings. Then, the recording relays will be directly operated from the adding machine, the keyboard of which is used by the operator.

Figure 2:
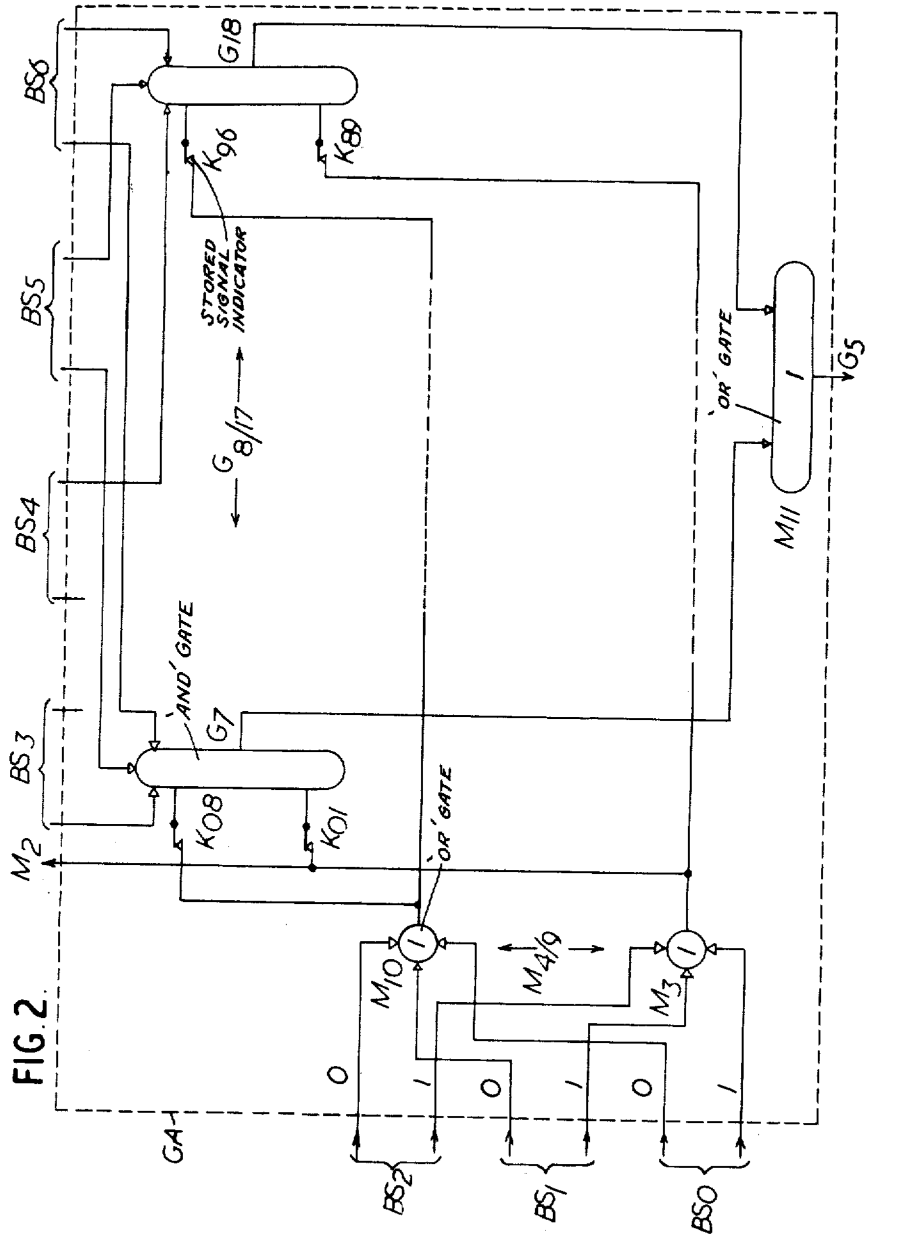
Figure 3:
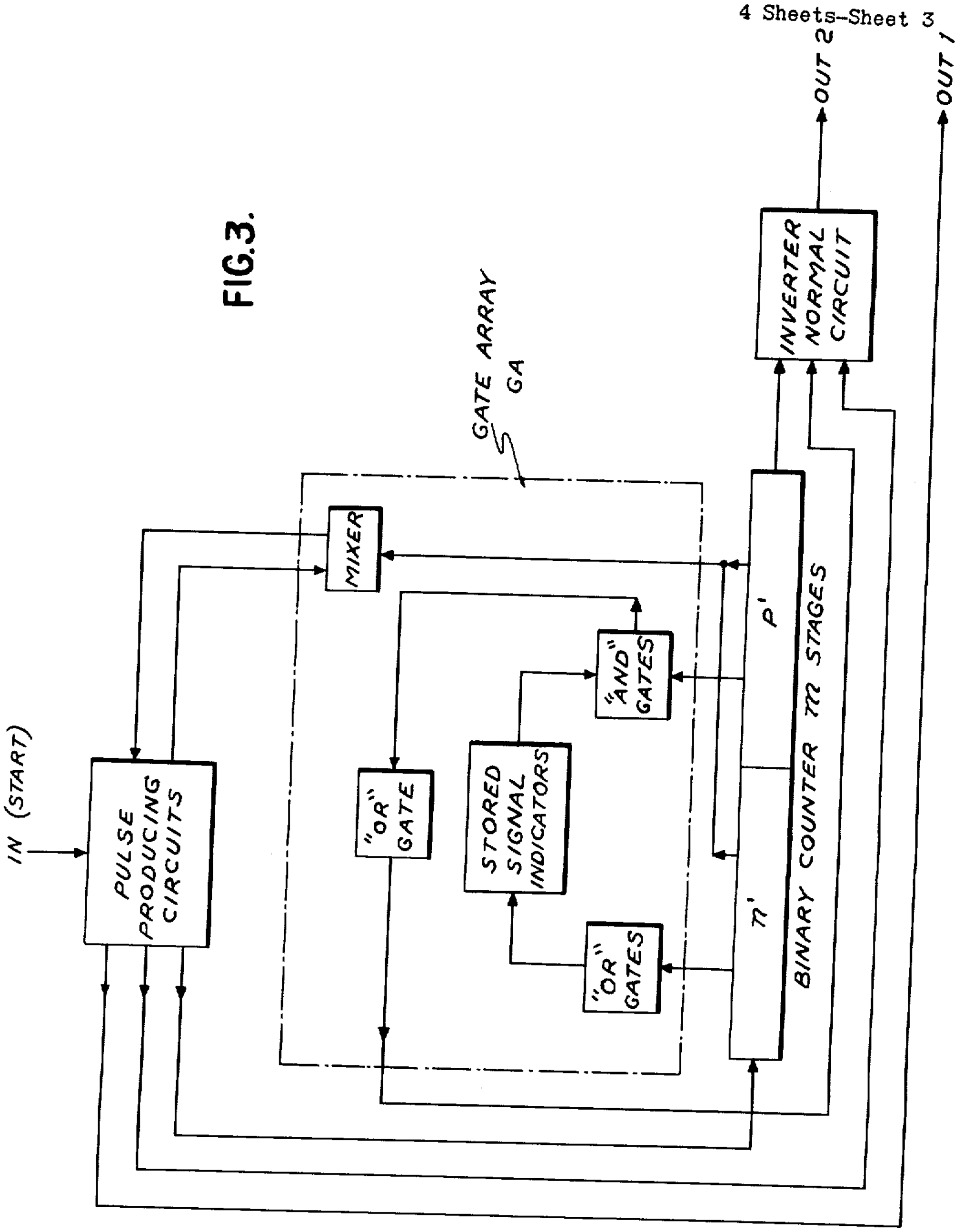
Figure 4:
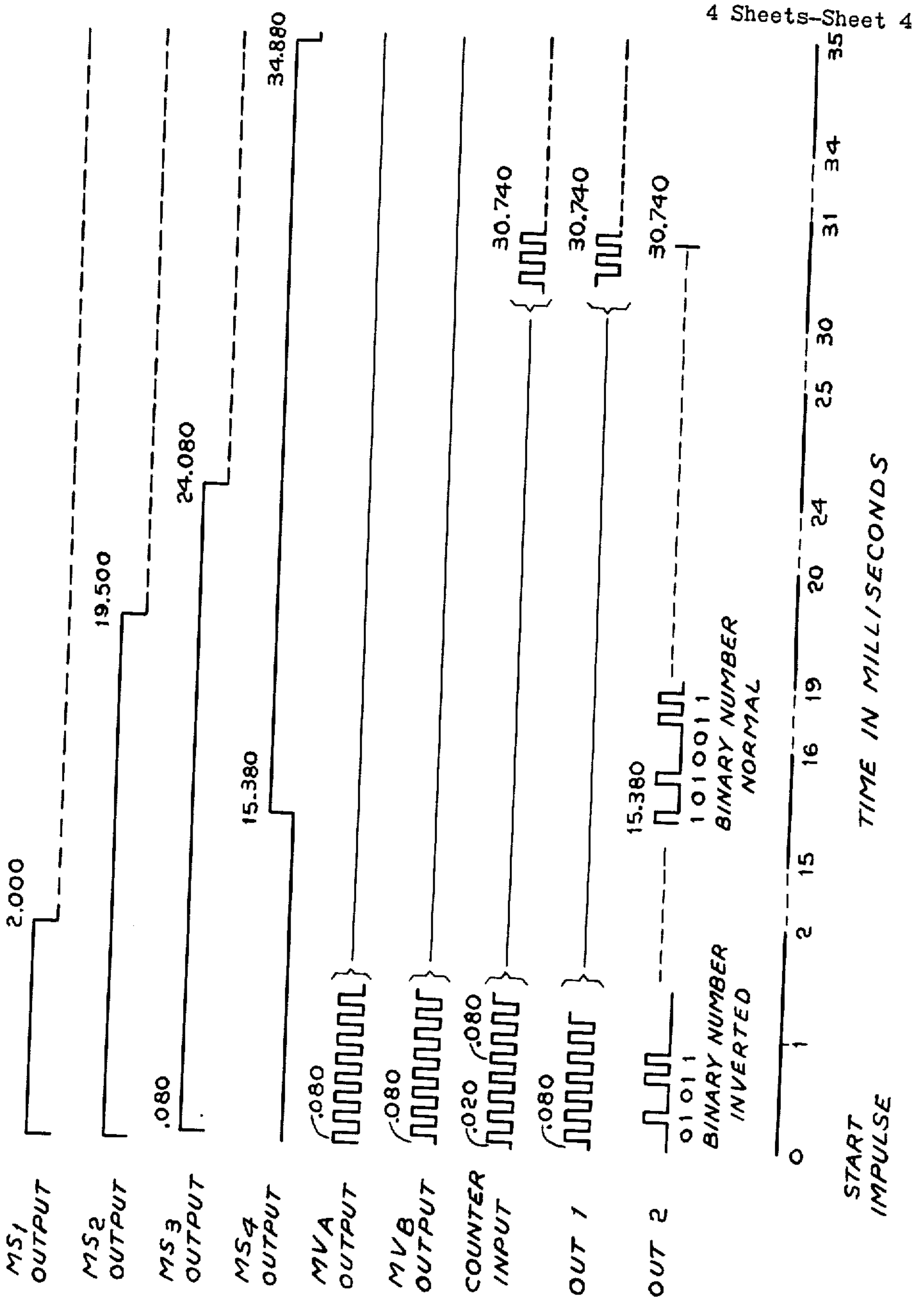

The above and other objects and characteristics of the invention and the best manner of attaining them will be best understood from the following description of a detailed embodiment of the invention to be read in conjunction with the accompanying drawings which represent:

FIG. 1, a diagram of an electrical encoding system in accordance with the invention;

FIG. 2, a diagram of the array of gates shown as a block in FIG. 1;

FIGURE 3 is a block diagram affording a more general view of the system illustrated in FIGURE 1; and FIGURE 4 is a timing diagram illustrating the signal waveforms occurring at various points in the system of FIGURE 1.

The invention will be illustrated in connection with a system of a known type in which the operator reading a cheque to be inserted into an envelope will key information pertaining to that cheque, and which information will be automatically recorded on a piece of magnetic tape permanently affixed to said envelope.

The information on a bank cheque or on a postal cheque may, for example, consist: of seven decimal digits to identify the account number of the cheque, in six decimal digits to record miscellaneous information generally known as identifying information, e.g., the type of cheque, debit or credit, date, identifying number of the operator or the machine used to encode the cheque, etc., in ten further decimal digits to characterise the amount of the cheque, and finally of one additional decimal digit which is always automatically encoded as an information end code, which end code is useful to control the various cheque processing machines, such as a sorting machine, through which the encoded cheques will later be handed.

Altogether, there are therefore $7+6+10+1=24$ decimal digits to be encoded on the cheque envelope by means of $24\times4=96$ binary digits.

Moreover, a double encoding is made as a safeguard during the handling of the encoded cheques. To this end, after the whole information consisting of the 96 binary digits has been printed on the magnetic tape, it is immediately followed by another recording of the 96 binary digits but with a reversal of all the digits. This will ensure a ready check should any part of the magnetic tape be damaged during its passage through a processing machine. At the same time, one is readily able to verify that the electrical circuits, involved in reading and handling the information on the magnetic tape, function in a correct manner.

Though the details of this will not be described, it should be assumed that the operator will use the adding machine keyboard in order to key all the information read on the cheque, that some digits of the information to be printed, such as the end code, will be automatically recorded as well, and that all the 24 decimal digits or the corresponding 96 binary digits will be recorded on relays most of which will thus be operated directly from the adding machine by electrical contacts closed by the latter upon the operation of the motor bar as each item of information, such as cheque account, number or the amount is keyed by the operator.

Assuming that the 96 relays now record the complete information in a binary coded decimal manner, the circuit of FIG. 1 will now be described.

Referring to FIGS. 1 and 3, IN constitutes the input terminal which is fed by a photocell arrangement adapted to recognize that a cheque carrier bearing its piece of magnetic tape is ready to pass along a fixed magnetic head to which signals should then be applied in order to print the information as the cheque carrier passes along the magnetic head.

The advancement of the cheque carrier may be controlled by the operator and once she has read and keyed the necessary information, she may start the empty cheque carrier in motion so that the latter, passing in front of the magnetic head, will be encoded. Thereafter, the corresponding cheque may be automatically or manually inserted in the cheque carrier.

Still referring to FIGS. 1 and 3, and also to the timing diagram shown in FIG. 4, the initiating signal at terminal IN will trigger the monostable circuit $MS_1$ from its stable to its unstable condition where it will remain during a period of 2 milli-seconds. As soon as $MS_1$ is in that condition, it authorizes a flow of so-called A trigger pulses through the coincidence gate $G_1$. The trigger pulses are generated by the symmetrical multivibrator MV which, as indicated, has a period of 160 microseconds. The multivibrator shown is assumed to incorporate built-in differentiator circuits which provides on one side the A trigger pulses and on the other side the B trigger pulses which have the same period as the former but which are in anti-phase therewith.

These two trains of trigger pulses in phase opposition will condition all the operations of the electronic circuits to be described, and as well known, one of their uses is to readily permit the arrival of the unsynchronized signal at terminal IN in such a way that it can properly be dealt with by the remaining part of the electronic circuit where all the operations are synchronized on A or B pulse trains.

The first A pulse allowed through gate $G_1$ will be able to trigger the monostable circuits $MS_2$ from its stable into its unstable condition where it will remain for a duration of 19.5 milli-seconds.

Bearing in mind that the fundamental period of the circuit is 160 microseconds (MV) and that 96+96 binary digits have to be recorded in serial manner, this corresponds therefore to a time period equal to $192\times160$, thus about 30 milli-seconds. The period during which $MS_2$ is in its unstable condition therefore covers only the first registration of the information.

As soon as $MS_2$ has been triggered to its unstable condition, an activating signal is delivered to one input of the mixer $M_1$ which in turn delivers an activating condition at its output to unblock coincidence gate $G_2$ so that the latter will now pass the B pulses towards the output terminal $OUT_1$. A regular train of pulses will therefore be delivered to that terminal as long as gate $G_2$ is unblocked, and these pulses are synchronizing pulses which will be recorded on a separate track of the magnetic tape in antiphase with the information pulses. These synchronizing pulses are necessary when a non-return to zero scheme is used for the information pulses on the information track, such as a pulse for a binary 1 and no pulse for a binary 0. Thus, the synchronizing pulses constitute the time base for the information pulses.

At the same time, $MS_2$ in its unstable condition unblocks coincidence gate $G_3$ which therefore, passes the B pulses to the input of the monostable circuit $MS_3$. The first B pulse passing through $G_3$ must therefore trigger $MS_3$ to its unstable condition where it will remain during a period of 24 milli-seconds.

The activating signal at the output of $MS_3$ wil pass through the mixer $M_2$. From there it will also be applied through the mixer $M_1$ to continue the control on coincidence gate $G_2$ which will therefore remain unblocked during 24 milliseconds. The same activating signal at the output of $M_2$ is also applied to coincidence gate $G_4$ so that the latter will now pass the A pulses towards the binary counter consisting of the seven cascaded bistable circuits $BS_{0/6}$ each operating as a scale-of-two counter. All the stages of this binary counter formed by the bistable circuits $BS_{0/6}$ are normally in their zero condition. This is automatically achieved as follows:

The mixer $M_2$ in addition to the control exert from $MS_3$ is also controlled from the four bistable circuits $BS_{3/6}$ and from a lead coming from the gate array GA represented as a block in FIG. 1 and detailed in FIG. 2. As shown, the bistable circuits $BS_{3/6}$ exert their control in such a way that as long as at least one of them is in its one condition, the mixer $M_2$ will deliver an output signal. Likewise, as shown in FIG. 2, the output lead coming from the gate array GA is activated from the output of the mixer $M_3$, which output provides a signal as long as at least one of the three bistable circuits $BS_{0/2}$ is in its "one" condition.

Therefore, even when $MS_3$ is in its stable condition, as long as one of the seven bistable circuits is not in its zero condition, i.e. when the binary counter is not reset, mixer $M_2$ unblocks gate $G_4$ and permits driving A pulses to be sent to the binary counter. The latter will be driven through all its possible conditions, i.e., 127 at most, until it is returned to its reset condition where it will remain static since $M_2$ no longer delivers an output signal, and gate $G_4$ is therefore blocked. Thus, any condition of the binary counter which does not correspond to all the bistable circuits $BS_{0/6}$ in their zero condition, is an unstable one, and is always automatically replaced by a reset condition.

The A pulses admitted through $G_4$ pass through the delay circuit $D_1$ which subjects them to a delay of 20 microseconds. This delay is desirable since the A pulses, admitted through $G_4$ to drive the counter, are controlled by the condition of the latter. Moreover, as will be explained later, the A pulses are used to probe the condition of the gate array GA the condition of which is itself determined by that of the counter, and it is therefore undesirable that the latter should change its condition in coincidence with the A pulses.

The pulses at the output of $D_1$ are applied to the common input of $BS_0$ of which the zero output is shown to be connected to the common input of the next stage of the binary counter constituted by the bistable circuit $BS_1$, the zero output of the latter being in turn connected to the next stage and so on. The common inputs of the bistable devices are assumed to incorporate built-in differentiator circuits so that upon the return of a bistable circuit such as $BS_0$ into its zero condition, the state of the next bistable circuit such as $BS_1$ is changed.

Since 96 time units are required either for the recording of the normal form of the information, or for the recording of the complementary form, a seven-stage binary counter is therefore required, but this provides too many time units. The number of time units generated is readily adjusted to 96 by incorporating a feedback connection in the binary counter. This occurs between the output of the fifth stage ($BS_4$) and the input of the fourth stage ($BS_3$).

The first three stages $BS_{0/2}$ of the binary counter are used to control the eight OR gates shown in FIG. 2, while the next four stages of the counter are used to control the twelve AND gates of FIG. 2. It is therefore these last four stages of the binary counter, which may define up to 16 conditions, that must be restricted to 12 conditions by the feedback connection. Assuming that both $BS_3$ and $BS_4$ are in their zero conditions, after eight A pulses have been applied to the counter, $BS_2$ delivers an output pulse to $BS_3$ whereby the latter changes to the 1 condition. Eight pulses afterwards, it will again revert to the zero condition and this time $BS_4$ will be triggered into its 1 condition. However, this will now apply a pulse to the delay circuit $D_2$ which will retard it by 10 microseconds before applying it to the one input of $BS_3$. Since this delay of 10 microseconds in much smaller than the period of the driving pulses, i.e., 160 microseconds, there is a direct transition from the condition in which $BS_4$ and $BS_3$ register the binary number 10 into the condition where they register the binary number 11. Therefore, eight pulses afterwards, they will again record the binary number 00. In other words, out of the four possible conditions into which these two bistable circuits may be set, one of these is eliminated, whereby these bistable circuits only make a count of three instead of a count of four, producing the required number of 96 time units instead of 128. The condition 10 for $BS_4$ and $BS_3$ of course subsists for a short time, but it cannot be exploited by the A pulses.

As shown in FIGS. 1 and 2, the two outputs of each of the seven bistable circuits $BS_{0/6}$ control the gate array GA the output lead of which is applied in parallel to one input of the coincidence gate $G_5$ and the input of the inverter $I_1$.

As shown by FIG. 2, the six outputs of the bistable circuits $BS_{0/2}$ control the eight mixers $M_{3/10}$ of which only the first and the last have been shown. Each of these mixers will produce an output signal for seven out of the possible $BS_{0/2}$ eight conditions. For one particular condition of these three bistable circuits, a corresponding mixer will fail to deliver an output signal. Thus, in the reset condition for example, all three are in their zero condition and the mixer $M_{10}$ does not deliver an output signal, whereas all of the other mixers $M_{3/9}$ do deliver an activating signal.

On the other hand, the eight output conductors from the bistable circuits $BS_{3/6}$ are used to control the twelve coincidence gates $G_{7/18}$ in such a way that only one out of these twelve gates may at any time deliver an activating signal. If the sixteen conditions of that part of the counter consisting of $BS_{3/6}$ were all used, just as the OR gates $M_{3/10}$ require three inputs, the AND gates $G_{7/18}$ would require four inputs coming from the bistable circuits $BS_{3/6}$. However, since the condition of the bistable circuits $BS_4$ and $BS_3$ corresponding to 10 is not used, the numbers 00 and 11 defined by these two bistable circuits must be recognized by applying only one input from one of these two bistable circuits, i.e., combination 11 and 00 may be respectively recognized from $BS_4$ and $BS_3$ alone. Hence, eight of the AND gates will need only three inputs instead of four.

Out of the twelve AND gates $G_{7/18}$, only the first and last $G_7$ and $G_{18}$ are shown. Each of these twelve gates is additionally provided with eight inputs which come from the eight outputs of the mixer $M_{3/10}$ respectively through break contacts such as $K_{01}$ pertaining to the corresponding recording relays (not shown). These are inhibiting inputs which when energized prevent the associated gate from operating.

It will be recognized that with the scheme of FIG. 2, during the first eight time units, while $BS_{3/6}$ are still in their zero condition, only gate $G_7$ can possibly deliver an output signal. During the next eight time units the next gate $G_8$ will be in that condition, and so on, until during the last eight time units out of the 96, gate $G_{18}$ will be in that condition.

Inside of each set of eight time units defined by the condition of that part of the counter corresponding to $BS_{3/6}$ there will successively be one of the mixers $M_{3/10}$ which will not deliver an activating signal at its output. Therefore, as long as all the contacts are closed, none of the gates $G_{7/18}$ can possibly deliver an output signal, and accordingly, the final output mixer $M_{11}$ driven by each of these twelve gates can never deliver an output signal in these conditions. But, if during the first, the ninth, the seventeenth time unit, etc. during which $M_3$ does not deliver an output signal, contact $K_{01}$, $K_{09}$, $K_{17}$, etc. is open due to the operation of the corresponding relay, then the mixer $M_3$ no longer exerts an inhibiting action on gates $G_7$, $G_8$, $G_9$ etc. During these time units on the other hand, the outputs of the remaining mixers $M_{4/10}$ must necessarily be activated, with the result that the gates such as $G_7$, $G_8$, $G_9$ will then be able to deliver an activating signal. Thus, in this manner, an output pulse may be provided to indicate that the relay is operated and the recorded information will be translated into a series of pulses.

Referring to FIG. 1, the signals, eventually produced at the output of GA when the contact corresponding to the time unit is open, are applied in their normal form to one input of coincidence gate $G_5$ and in their inverse form, after passing through inverter $I_1$, to one input of the coincidence gate $G_6$. Furthermore, $G_5$ and $G_6$ are respectively controlled by the monostable circuit $MS_4$ in its unstable and in its stable condition. At the beginning of an encoding operation, $MS_4$ is normally in its stable condition and it therefore authorizes $G_6$ only. Further, from the moment $MS_3$ has been triggered into its unstable condition, $M_2$ delivers an activating signal which also authorizes both the gates $G_5$ and $G_6$. Consequently, in the absence of an activating condition delivered by the gate array GA and corresponding therefore to a closed relay contact, $G_6$ will allow the passage of the A pulse towards the second output terminal $OUT_2$ delivering the train of the information pulses. Hence, if a de-energized relay corresponds to a 0, a pulse will be produced at terminal $OUT_2$ corresponding to their recording of a binary 1. In other words, the complementary form of the information will be recorded first.

The train of information pulses characterizing the complementary recording will therefore be produced in synchronism with the synchronisation pulses at terminal $OUT_1$, until the binary counter $BS_{0/6}$ has made a full revolution and $BS_6$ is triggered back to its zero condition. At the moment the $BS_6$ will deliver a trigger pulse which will place $MS_4$ into its unstable condition where it will remain for 19.5 milliseconds. From that moment onwards, it is gate $G_5$ which will be authorized instead of gate $G_6$, with the result that during the second scanning of the information recorded by the relays, reverse conditions will occur and an output pulse at terminal $OUT_2$ will now correspond to the binary digit 1 and to the operated condition of the corresponding relay.

The period of 19.5 milliseconds is adequate to cope with the recording of 96 bits, since these correspond to a period of 15 milliseconds.

It will be noted that after 19.5 milliseconds from the start of the operation, $MS_2$ will be returned to its stable condition. But, at that moment $MS_3$ is still in its unstable condition, and through mixer $M_2$ it provides an activating signal to the mixer $M_1$, the gate $G_4$ and the gates $G_5$ and $G_6$. Therefore, the encoding operations will still proceed. Even after $MS_3$ has returned to its stable condition, $M_2$ will still deliver an activating signal due to at least one of its inputs receiving an activating signal since the counter is making its second revolution. At the end of this second revolution however, when the binary counter is reset, the output of $M_2$ is no longer activated and consequently the gates $G_2$, $G_4$, $G_5$ and $G_6$ are all blocked and stop the stream of information and synchronizing pulses.

The division of the binary counter into a first part controlling the OR gates and in a second part controlling the AND gates should be made in a manner which limits the total number of gate inputs. This will in most cases be achieved by using more or less an equal number of stages for both parts. Tentative solutions can readily be checked to determine if they constitute optimum solutions.

While the total number of time units defined by the scanning arrangement as described above should preferably be the product of two numbers, such as 8 and 12, which are relatively near to one another, if a different number of time units is required, the higher multiple of the product can be chosen, and the last time units in a cycle not used. This may readily be achieved for example by providing additional feedback connections for the binary counter so that it jumps back directly to the reset condition after it has reached the condition charactering the last time unit of the cycle.

While the principles of the invention have been described above in connection with specific apparatus, it is to be clearly understood that this description is made only by way of example and not as a limitation on the scope of the invention.

What is claimed is:

1. A system for converting a parallel digital representation, including a multiplicity of statically stored signal conditions, into a serial pulse train containing a corresponding multiplicity of pulse elements, comprising:
   a multiplicity of bistable devices constituting a static parallel register, said multiplicity being sub-divided into a plurality of equal groups arranged in a coordinate array;
   means arranged along the coordinates of said array for coincident selection of any bistable device therein;
   means coupled to said coincident selection means for causing said means to scan said array of devices in a predetermined periodic sequence; and
   means coupled to said devices and to said coincident selection means for producing a binary pulse train in step with said sequential scan, the elements of which pulse train are characterized by binary conditions corresponding to the signal conditions statically registered by the corresponding bistable devices interrogated by said selection means.

2. A system for converting a parallel digital representation, including a multiplicity of statically stored binary signal conditions, into a serial pulse train containing a corresponding multiplicity of binary pulse elements comprising:
   a multiplicity of bistable devices constituting a static parallel register, said multiplicity being sub-divided into a plurality of equal groups, each group containing a predetermined plurality of said devices arranged in a predetermined order;
   a binary digital counter having a total of $m$ stages where $m$ is a number considerably less than the number constituting said multiplicity, said counter being sub-divided into first and second distinct parts, each including a plurality of stages;
   a source of periodic counting impulses;
   means for applying said pulses to said counter to cycle said counter through its sequential digital states in a periodic sequence;
   a plurality of gate circuits individually associated with said groups of devices, each said gate circuit being controlled by a combination of outputs taken from said first part of said counter, a different one of said gate circuits being thereby partially enabled for each digital state manifested by the counting stages in said first part;
   means coupled to said second part of said counter and in multiple to said groups of devices for conditioning each said partially enabled gate circuit to transfer a binary pulse train at the output thereof, the binary pulse elements of said train corresponding, in duration, to the said periodic counting impulses, and in binary condition, to the sequence of signal conditions registered by the ordered arrangement of devices in the group associated with the partially enabled gate circuit; and
   means coupled to all of said gate circuits for combining the serial pulse train outputs thereof into a single pulse train.

3. A converting system according to claim 2 in which the said gate circuit condiitoning means includes an individual OR-circuit for each digital state associated with said second part of said counter, each said OR-circuit being rendered effective, relative to the said partially enabled gate circuit, only when all of the inputs thereof are coincidentally inactive.

4. An electrical encoding system as claimed in claim 2 in which:
   the said first part of said counter is adapted to cycle through a count of $n$ corresponding to the number of circuits in said plurality of gate circuits, and in which
   said second part is adapted to cycle through a count of $p$ corresponding to the number of devices in each said associated group; and further in which
   said gate circuit conditioning means includes a plurality of OR-circuits each controlled by a combination of outputs from said second part of said counter, there being one OR-circuit for each of said $p$ counting states of said second part, each said OR-circuit being connected in multiple through one device in each said group to corresponding inputs of all of the associated gate circuits, the said multiple through connections being such that for each counting state of said second part one and only one of said OR-circuit outputs is rendered inactive while all of the other OR-circuit outputs are active, and further such that said partially enabled gate circuit is responsive only to the said inactive OR-circuit output in combination with the condition of the said bistable device through which the said inactive output is coupled.

5. A converting system as claimed in claim 2 in which the number of stages in the said first and second parts of said counter are approximately equal.

6. A converting system as claimed in claim 2 in which the said means for applying said periodic counting impulses to said counter is arranged to continue applying said counting impulses once the state of said counter has been changed from an initial reset condition, until the counter returns to said initial state, at which time said circuit is capable of being rendered inoperative.

7. A converting system as claimed in claim 6 further comprising:
   means for producing a starting signal having a duration greater than the time required for said binary counter to step through an entire cycle of counting states,
   said means for applying counting impulses being responsive to either said starting signal or to the combined outputs of said first and second parts of said counter, in all but said initial state, for continuing to apply said counting impulses to said counter throughout the duration of said starting signal, and for thereafter continuing to apply said counting impulses until said counter cycles to said initial state.

8. A converting system as claim in claim 7 further comprising:
   means for inverting the said single pulse train produced by said combining means; and
   means coupled to said pulse train combining means, to said inverting means, and to said counter, for transferring the normal form of said pulse train during the first cycling of said counter controlled by said starting impulse, and for subsequently transferring the inverted form of said pulse train during the next cycling of said counter, during which the said starting impulse is terminated.

9. A converting system as claimed in claim 2 in which the said devices comprise normally closed relay contacts connected between the said multipled outputs of said OR-circuits and the said corresponding inputs of said gate circuits.

References Cited in the file of this patent

UNITED STATES PATENTS

| | | |
|---|---|---|
| 2,894,254 | Mork | July 7, 1959 |
| 2,954,166 | Eckdahl | Sept. 27, 1960 |
| 2,978,685 | Eckdahl | Apr. 4, 1961 |